March 28, 1939.  T. R. SCOTT ET AL  2,152,504
COAXIAL CABLE TERMINAL
Filed June 20, 1936   3 Sheets-Sheet 1
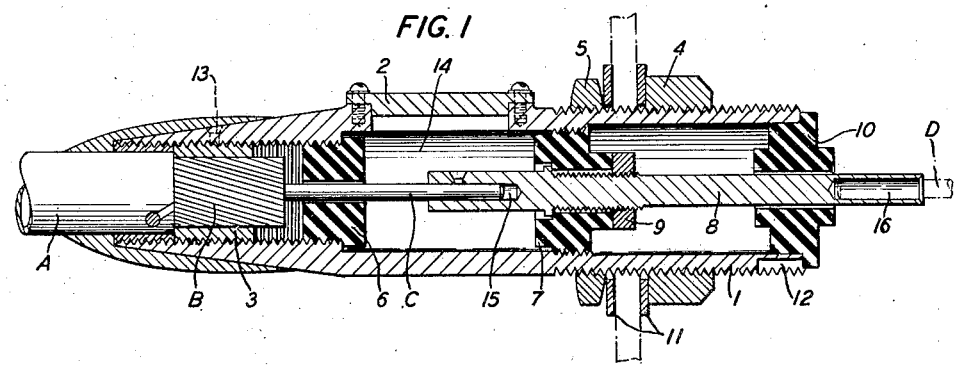
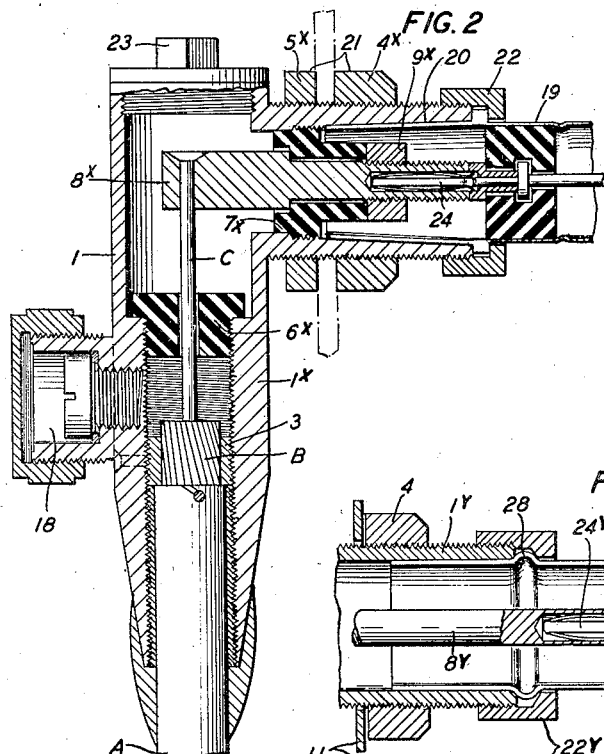
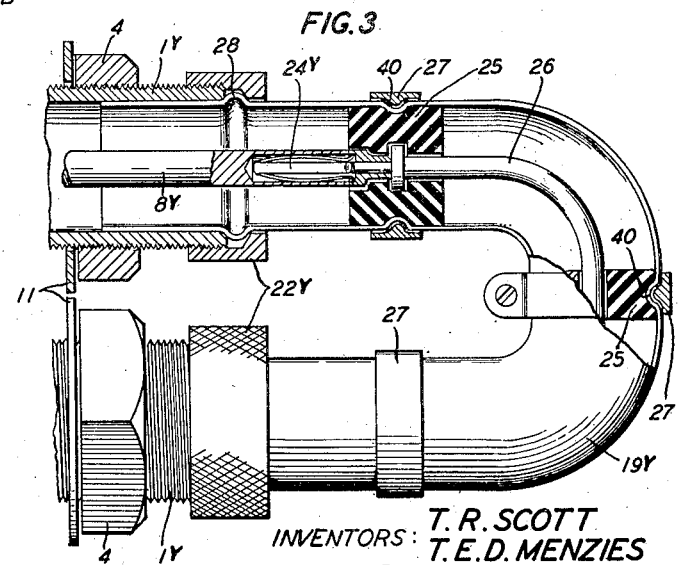
INVENTORS: T. R. SCOTT
T. E. D. MENZIES
BY J. MacDonald
ATTORNEY March 28, 1939.  T. R. SCOTT ET AL  2,152,504
COAXIAL CABLE TERMINAL
Filed June 20, 1936  3 Sheets-Sheet 2

INVENTORS: T. R. SCOTT
T. E. D. MENZIES
BY J. MacDonald
ATTORNEY

March 28, 1939. T. R. SCOTT ET AL 2,152,504
COAXIAL CABLE TERMINAL
Filed June 20, 1936 3 Sheets-Sheet 3

INVENTORS: T. R. SCOTT
T. E. D. MENZIES
BY J. MacDonald
ATTORNEY

Patented Mar. 28, 1939

2,152,504

UNITED STATES PATENT OFFICE 2,152,504

COAXIAL CABLE TERMINAL

Thomas R. Scott and Thomas E. D. Menzies, Aldwych, London, England, assignors to Western Electric Company, Incorporated, New York, N. Y., a corporation of New York Application June 20, 1936, Serial No. 86,248
In Great Britain July 8, 1935

3 Claims. (Cl. 174—19)

This invention relates to improvements in high frequency coaxial cable installations, and has for its main object to provide means for sealing and/or terminating such cables for example in repeater stations, exchanges or radio installations where they are required to be connected to the signal transmitting or receiving equipment.

In such coaxial cable systems, special provision requires to be made for the termination of the cables. When it is realized that each coaxial cable of the system may be carrying a hundred or more message channels it is clear that the usual type of terminal box used with telephone toll cables is quite unsuited for the new type of cable in question, as it is important to maintain the electrical continuity and coaxial arrangement of the conductors right through to the equipment with which the cables are to be associated.

The present invention, therefore, provides a method of terminating coaxial conductor cables by connecting to the end of the cable a terminating device having a chamber wherein the cable may be sealed and secured in position, the electrical continuity and coaxial arrangement of the cable conductors being maintained in the terminating device for connection to the equipment with which the cable is associated, for example, in exchange repeater station or radio installation.

According to a feature of the invention there is provided a terminating device for the end of a coaxial conductor cable comprising a casing forming an outer conductor and supporting an inner conductor, the arrangement being designed to preserve the electrical continuity and coaxial arrangement of the cable conductors for connection to the electrical equipment associated with the cable, and providing means for securing the cable to a support where the cable terminates.

According to another feature of the invention, the terminating device comprises a detachable link including an inner and outer conductor adapted to cooperate with the inner and outer conductors of the terminating device and enabling the cable to be isolated from its associated equipment when required for testing or other purposes. Preferably the link comprises plug or socket members for cooperation with corresponding plug or socket members for the inner and outer conductors on the device, whereby the parts are readily separable, and a locking device may be provided for cooperation with said link to prevent accidental removal thereof.

According to another feature of the invention, the terminating device comprises a metal sleeve which may be in the form of an elbow or straight-through connection forming a continuation of the outer conductor of the cable, said sleeve being provided with fixing means for clamping to a panel or the like for example in an exchange or repeater station. This sleeve may be provided with internal insulating spacers for maintaining the inner conductor coaxial with respect to the sleeve, and means may be provided for filling the interior of the sleeve with insulating material, for example, polystyrene, and sealing the cable end.

According to a further feature of the invention the terminating device may be provided with an insulator cap for external mounting.

The invention will be better understood by reference to the accompanying drawings in which Fig. 1 is a longitudinal section through one form of terminating device according to the invention;

Fig. 2 is a sectional elevation of a modified form of terminating device according to the invention;

Fig. 3 is a part sectional view of a connecting U link for association with the terminating device according to the invention;

Figure 4:
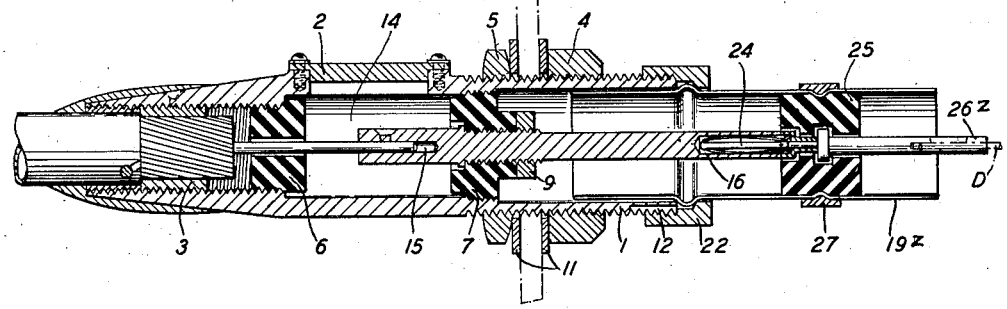
Fig. 4 is a sectional view showing a modified form of connecting device according to the invention.

The termination shown in Fig. 1, consists of an outer casing 1 of gunmetal or other suitable alloy which is plumbed to the cable sheath indicated at A and is in direct electrical contact with the outer conductor B of the cable via the screwed brass ring 3 which is soldered to the copper tapes forming the outer conductor and by means of the soldering holes 13 to the outer casing. The interior of the casing 1 is fitted with screwed and stepped bushes 6 and 7 formed of high quality insulating material such as moulded Bakelite. These bushes serve to centralize the inner brass connector 8 whilst at the same time forming the end walls of the sealing chamber 14. The dimensions of the step are designed to ensure a high resistance leakage current path both under compound and in air. The inner connector is provided with soldering sockets 15 and 16 at the inner and outer ends respectively in which the inner conductor C of the cable and the outgoing conductor wire indicated at D are soldered. The rigidity of the inner connector 8 is secured by means of the locking nut 9 which permits the connector to be tightened up against the bush 7. The central sealing chamber 14 is provided with a filling opening and cover plate 2 held in position by four set screws. This filling opening gives access to the inner connector for soldering purposes. The outgoing end of the casing 1 is fitted with a bush 10 of moulded insulating material through which the inner connector passes and which serves to prevent the ingress of dust, etc. into the space between the bushes 10 and 7. The outside of the outgoing end of the casing 1 may be screwed and fitted with nuts 4 and 5 and washers 11 as a means of fixing the termination to a frame or panel. A groove 12 enables a soldered outgoing wire connection to be made to the outer casing. The filling medium may be polystyrene or other suitable compound having the requisite electrical and physical properties.

An alternative design suitable for indoor mounting where it is desired to take off the outgoing connection in a direction at right angles to that of the incoming cable is shown in Fig. 2. The outer casing 1X is in the form of a right angled bend of gunmetal or other suitable alloy which is plumbed to the cable sheath A and which is in electrical contact with the outer conductor B of the cable as described under Fig. 1. An alternative method is to solder the outer conductor to the sheath directly, thereby making electrical contact to the outer casing, via the lead sheath and plumbed joint. The interior of the casing is fitted with screwed and stepped bushes 6X and 7X whose design and function is already explained in Fig. 1. The inner connector 8X is drilled to take the inner conductor C of the cable which may be soldered thereto. The outer end of the connector may have a socket designed to take a plug connection 24 in which the electrical contact is obtained by means of spring contacts of phosphor bronze or other suitable metal. A removable screw cap 23 gives access to the connector for soldering and compound filling purposes. The rigidity of the inner connector is ensured by means of the locking nut 9X. The outgoing T piece of the casing may have its inner surface 26 machined either parallel or with a slight taper to accommodate the outer casing 19 of a plug-fitting and thereby maintain electrical continuity. The outside of the T may be screwed and fitted with frame or panel fixing nuts 4X and 5X. A locking ring 22 as described hereafter can also be screwed on to the casing. A nipple 18 with double screw sealing devices as shown may be provided on the outer casing which permits of air or gas being applied to the interior of the cable for pressure testing or desiccating purposes. The filling medium may be polystyrene or other suitable compound having the requisite electrical and physical properties as stated under Fig. 1.

In Fig. 3 an arrangement of a plug-in U link is shown. A U link of such a design provides a means of interconnecting the coaxial termination with the station equipment whilst maintaining the concentricity of the cable and whereby the latter can be isolated from the cable for test or other purposes by the removal of the said link. In the design shown the link consists of a split outer connector 19Y of nickel plated brass or other suitable material. The inner connector 26 is located concentrically within the outer casing by means of the split bushes 25 of moulded Bakelite or other suitable insulating material. The inner connector 26 is terminated on each leg by spring contact strips forming plug connectors 24Y which are designed to be a good push fit in the sockets of the brass connectors 8Y. Shoulders may be provided on the inner connector 26 as shown to fit into corresponding grooves of two or more of the split bushes 25. The two halves of the outer connector 19Y are located in outside grooves of the bushes 25 by means of the corresponding depressions 40 on the outer connector which provide a registration for the split clamps 27 which hold the two halves of the connector together. Locking rings 22Y cooperating with the annular projections 28 and the casing 1Y may be provided to prevent the accidental removal of the U link. The outer surface of the connector engaging the casing 1Y should be polished in order to maintain the contact resistance at a minimum value.

In another arrangement shown in Fig. 4, a straight link is illustrated. This link may be used when it is desired to connect to the station equipment by means of wires and without maintaining the concentricity. The inner connector 26Z of the plug is drilled at its outer end to take the outgoing connection D which can be soldered thereto. The outer surface of the outer split connector 19Z may be tinned to form a suitable soldering surface for an outgoing wire connection.

Figure 5:
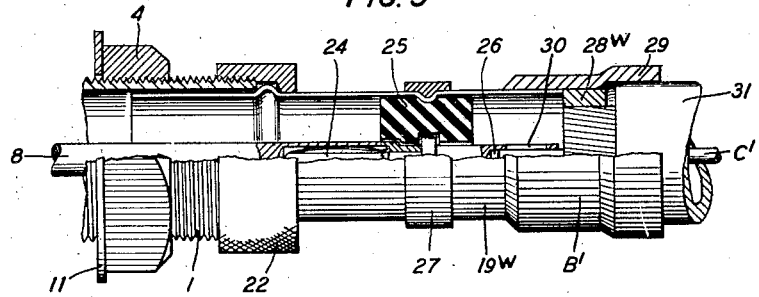
Fig. 5 is a part sectional view of a further modified form of connecting device.

Another alternative is shown in Fig. 5, which shows the outer end of the straight link connected to a flexible coaxial cable 31 by means of the soldering socket 30 for the inner conductor C1 and the brass sleeves 28W and 29 for the outer conductor B1 these brass sleeves being soldered respectively to the split outer connector 19W and the metal tapes of the outer flexible conductor B1.

Figure 6:
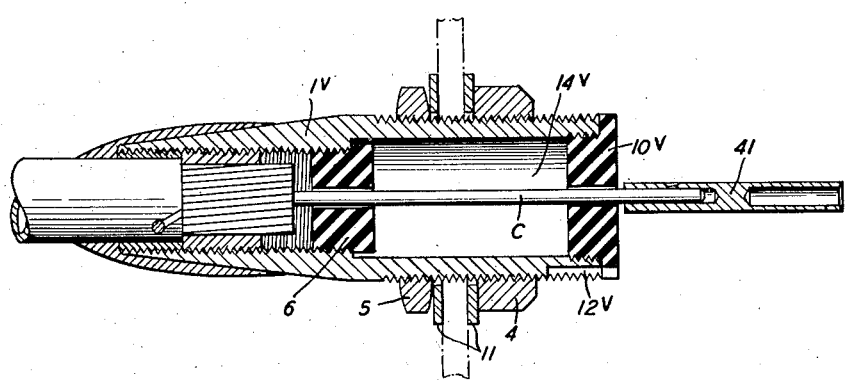
Figs. 6 and 7 are sectional elevations of modified constructions of terminating devices according to the invention in which the central conductor of the cable extends through the termination.
Figure 7:
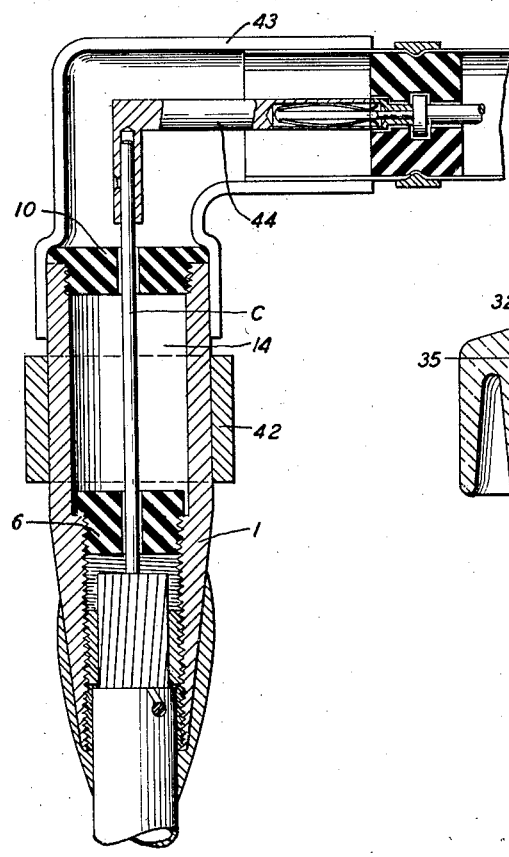

In another alternative shown in Fig. 6 the design of the termination may be simplified if the inner conductor C is permitted to pass through and extend beyond the casing 1V of the termination. The method of connecting the outer conductor to the casing would be as explained under Fig. 1. The inner conductor passes through the screwed and stepped bushes 6 and 10V formed of high quality insulating material. The inner bush 6 serves to centralize the inner conductor and forms one end of the sealing chamber 14V. The outer bush 10V centralizes the inner conductor at the point of emergence from the termination whilst forming the outer end of the sealing chamber 14V. A double ended soldering socket 41 would be connected to the inner conductor and the outgoing connector wire. The outside of the outgoing end of the casing 1V may be screwed and fitted with nuts 4 and 5 and washers 11 as a means of fixing the termination to a frame or panel as in Fig. 1, or the outside may be plain as in Fig. 7 and the fixing provided by means of a clamp 42 secured to the termination or to the cable. The outside of the outgoing end of the casing 1V may have a groove 12V in which a wire connection may be made to the outer casing. The sealing chamber 14V may be filled with suitable compound as before described. In order to provide a termination of the right angled type, an extension piece in the form of a split right angled bend 43 may be secured to the casing 1V as indicated in Fig. 7. In this arrangement a right angled double ended soldering socket 44 may be attached to the central conductor as shown.

Figure 8:
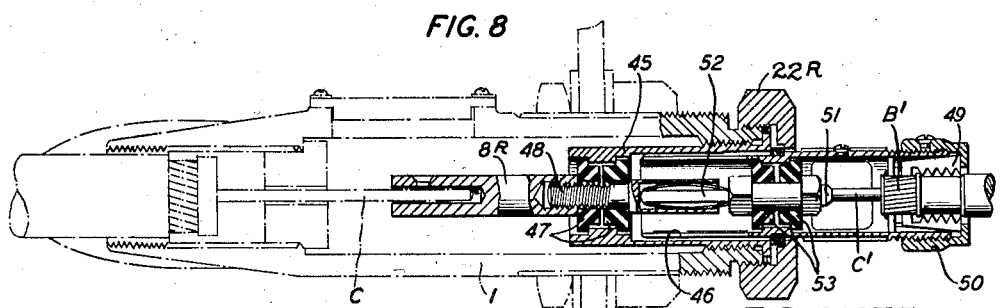
Fig. 8 is a sectional view showing a modified form of plug and socket connection and adapter.

In the arrangement shown in Fig. 8 an adapter 45 is screwed into the end of the casing 1 to provide a smaller diameter for the detachable plug connection 46 associated with a length of flexible coaxial cable. The connector 8R associated with the inner conductor C is supported in the adapter by the insulating bushes 47 secured by the threaded stem 48 of the socket as shown. The plug 46 is secured to the outer conductor B' of the flexible cable length by the split clamping device 49 and screw ring 50, the central conductor C' being soldered at 51 to the central plug device 52, supported by the insulating bushes 53. A locking ring 22R may be provided.

Figure 9:
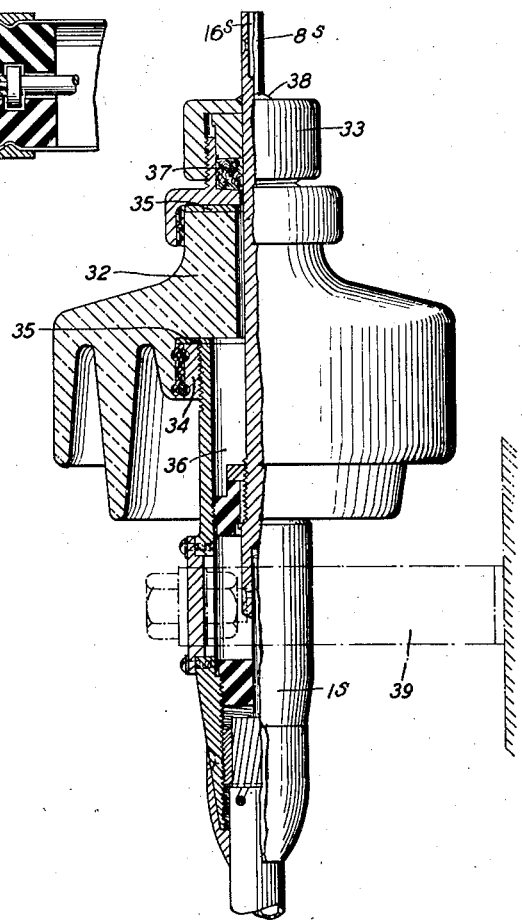
Fig. 9 is a part sectional elevation of a termination according to the invention particularly adapted for outdoor mounting.

An arrangement of the termination adapted for outdoor mounting with provision for connection to an incoming aerial wire is shown in Fig. 9. The design of the terminal is similar to Fig. 1 except that the inner connector 8S is extended outwards to pass through the porcelain insulator 32. The insulator which should be of high quality electrical porcelain or other suitable insulating material has a metal cap forming part of the packing gland 33 secured to the top by means of cement, whilst a screwed brass ring 34 is fixed by a similar means to the lower end. Packing washers 35 may be inserted as shown. The insulator 32 is assembled to the termination casing 1S by means of the screwed ring 34. Prior to assembly the annular space 36 between the inner connector 8S and the casing 1S also between the insulator 32 and the inner connector may be filled with a suitable compound as already described. The inner connector 8S passes through the gland which may be of the design shown. The waterproof packing 37 can be of esterified cotton yarn impregnated with a compound such as Ozokerite. In order to completely seal the gland after full compression of the packing a soldered joint as indicated at 38 may be made between the cap and the inner connector as a further safeguard against the ingress of moisture. If necessary the screw threads may be coated with a sealing varnish to prevent the possibility of moisture seeping into the termination. The connection to the aerial wire may be made by means of the soldering socket 16S. A suitable method of supporting the completely assembled termination on a wall, pole, or other structure would be by means of a bracket as indicated at 39.

As the power supply for repeater stations in a coaxial conductor cable system is sometimes required to be transmitted over the cable at a relatively high voltage and low frequency it will be understood that the terminations according to this invention are designed to withstand the usual test voltage applicable to the normal power transmitting voltage required.

What is claimed is:

1. A terminating device for a coaxial cable having a tubular conductor and a wire conductor disposed in concentric relation, said device comprising a casing of conducting material having portions disposed at an angle relative to each other, a sleeve soldered to the tubular conductor of the cable and threadedly engaging one of said portions, an insulating bushing threading into said casing at a point adjacent said sleeve for supporting the wire conductor in concentric relation with said casing portion, another insulating bushing threading in the other of said casing portions, a conducting link secured to the last-mentioned bushing and having means for engaging the end of the wire conductor of the cable for establishing electrical connection therewith, and a plug mounted in the last-mentioned portion of said casing and having means for connecting the other end of said link with the outgoing centrally disposed wire conductor of the cable.

2. A terminating device for a coaxial cable having a tubular conductor and a wire conductor disposed in concentric relation with respect to each other, said device comprising a casing of conducting material having an interiorly threaded portion, a sleeve of conducting material secured to the tubular conductor of the cable and threadedly engaging the interiorly threaded portion of said casing for holding the end of the tubular conductor against end-wise movement in said casing and electrically connecting the tubular conductor to said casing, a bushing of insulating material engaging said threaded portion for holding the wire conductor in position concentric in the interior of said casing, another threaded portion in the interior of said casing, a bushing engaging the last-mentioned threaded portion of said casing, a link conductor supported by the last-mentioned bushing, said link conductor having means at one end for engaging the end of the wire conductor for establishing electrical connection therewith, said bushings cooperating with said casing to form a sealing chamber around the engaged ends of the wire conductor with said link conductor and a plug device having its conducting elements in concentric relation engaging said casing and the opposite end of said link conductor respectively.

3. A terminating device for a coaxial cable having a tubular conductor and a wire conductor disposed in concentric relation with respect to each other, said device comprising a casing of conducting material having an interiorly threaded portion, a sleeve of conducting material secured to the tubular conductor of the cable and threadedly engaging the interiorly threaded portion of said casing for holding the end of the tubular conductor against end-wise movement in said casing and electrically connecting the tubular conductor to said casing, a bushing of insulating material engaging said threaded portion in said housing for holding the wire conductor in position concentric in the interior of said housing, another threaded portion in the interior of said housing, a bushing of insulating material engaging the last-mentioned threaded portion of said housing, a link conductor supported by the last-mentioned bushing, said link conductor having means at one end for engaging the end of the wire conductor for establishing electrical connection therewith, said bushings cooperating with said casing to form a sealing chamber around the engaged ends of the wire conductor and said link conductor and a plug device having its conducting elements in concentric relation engaging said casing and the opposite end of said link conductor respectively, means for securing the outer-disposed conductor of said plug to said casing, and means carried by the opposite end of said link conductor for resiliently engaging the centrally disposed conducting element of said plug.

THOMAS R. SCOTT.
THOMAS E. D. MENZIES.